J. R. HOLLEY.
PERCOLATOR.
APPLICATION FILED AUG. 6, 1908.
913,293.
Patented Feb. 23, 1909.
Fig. 1.
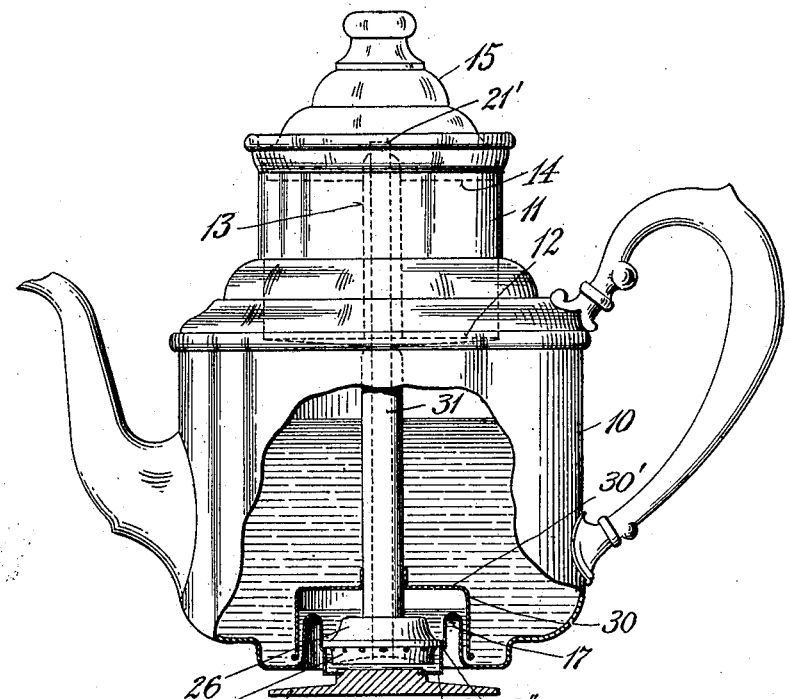
Fig. 2.
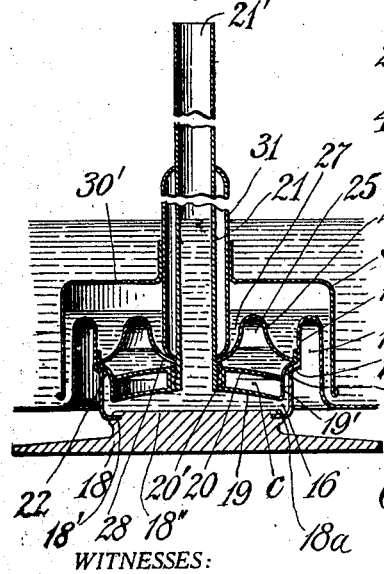
Fig. 3.
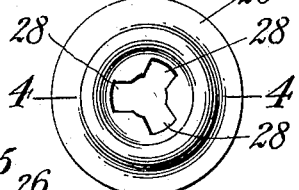
Fig. 4.
Fig. 5.
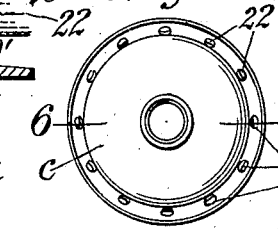
Fig. 7.
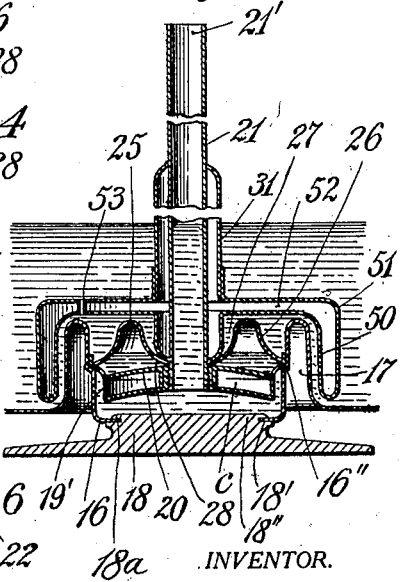
Fig. 6.
WITNESSES:
A. B. Burns
Francis T. Miller
INVENTOR.
J. R. Holley,
BY Chas. F. Schmelz
ATTORNEY.

UNITED STATES PATENT OFFICE.

JULIAN R. HOLLEY, OF BRISTOL, CONNECTICUT, ASSIGNOR TO THE BRISTOL BRASS COMPANY, OF BRISTOL, CONNECTICUT, A CORPORATION OF CONNECTICUT.

PERCOLATOR.

No. 913,293.　　　　Specification of Letters Patent.　　　Patented Feb. 23, 1909.

Application filed August 6, 1908. Serial No. 447,310.

*To all whom it may concern:*

Be it known that I, JULIAN R. HOLLEY, a citizen of the United States, and resident of Bristol, in the county of Hartford and State of Connecticut, have invented certain new and useful Improvements in Percolators, of which the following is a full, clear, and exact specification.

This invention relates to percolators or similar apparatus, and it has for one of its objects the provision of an improved device for bringing small quantities of liquids rapidly to a boiling point and to project the same above the level of the main body of the liquid in the vessel or pot.

My invention has furthermore for its object the provision of means for practically isolating the steam generating device and the ejector-tube connected therewith from the liquid supply in the vessel, so that the heat necessary for the proper operation of such device may not be diffused or prematurely lost.

Further objects will be found in the general organization and construction of the device, as a whole, as will be hereinafter described, and the means for the attainment of which will be particularly pointed out in the claims.

Briefly stated, the present invention is especially applicable to the class of devices generally known as "coffee-percolators" in which a quantity of ground or powdered coffee is placed in a tray above the water in the pot, and small quantities of such water are heated and projected to a point above the coffee, so that this hot water will then be distributed over the same and gradually drip back into the main body of liquid in the receptacle.

In order to establish the process of ebullition, or what is usually understood as "pumping", it is of vital importance, firstly, to isolate the heating chamber or pump from the main body of the liquid in the receptacle, as far as it may be practicable; secondly, to concentrate the heat of the flame directly to the heating chamber; and thirdly, to organize the feed ducts through which fresh liquid is admitted into the heating chamber in such a manner that the liability of the heated liquid returning directly into the main body of the liquid in the receptacle will be reduced to a minimum and so that the steam pres- sure generated in the heating chamber may become fully effective in ejecting the water from the ejector tube and over the material in the tray. In other words, the construction of the heating chamber should be such that liquid from the main receptacle or reservoir may readily enter into the chamber, but at the same time be restricted from returning into the reservoir under sudden pressure-impulses generated in the chamber.

The present invention accomplishes the several desired results, and without requiring any check-valve or other device of that nature, as clearly illustrated in the accompanying drawings, in which similar characters denote similar parts, and in which—

Figure 1 is a general view of a percolator embodying my invention, Fig. 2 represents a central section of the "pump" of the device, Fig. 3 is a top view of the upper air cup used in connection with my invention. Fig. 4 is a vertical section thereof, on line 4, 4 of Fig. 3. Fig. 5 represents a top view of the lower air chamber, Fig. 6 is a vertical section thereof, on line 6, 6 of Fig. 5, and Fig. 7 illustrates a modification.

In the drawings, 10 denotes a liquid-receptacle or pot which may be of any preferred form, and is adapted to receive at its top a holder or percolator shell 11 having a foraminous bottom or tray 12 on which the ground coffee is placed, and also provided with a centrally-disposed tube 13 the top of which has a series of apertures through which any overflow liquid in the holder 11 may return into the main reservoir 10. The upper portion of the percolator shell 11 is adapted to receive a perforated distributing plate 14, which, in turn, may be covered by a glass hood 15 to prevent the hot water, as it is projected upward by the pump in the reservoir, from spattering.

Formed in the bottom of the pot 10, is a cup 16 the cylindrical wall 16' of which is separated from the liquid in the reservoir by an annular air-space 17 formed by flanging the cup wall 16' outward and downward, and forming a tight joint with the bottom plate. This cup constitutes the heat-receiving portion of the percolator and the liquid in the bottom thereof can be quickly brought to a boiling point, inasmuch as the heat from the flame or fire may be concentrated thereon by a base plate 18 which may be tightly connected with the bottom plate of the cup 16 in any desired manner, and which at the same time serves as a base for the entire receptacle to stand upon.

The annular wall 16' of the cup 16, has a shoulder 16'' adapted to receive and support the outwardly-flanged edge of a closed air chamber $c$ formed by a bottom plate 19, vertical wall 19', top plate 20, and central wall 20' forming an aperture through said chamber and preferably screw-threaded to receive the lower end of an ejector tube 21 which forms an air tight joint therewith and projects upward and through the central portion of the percolator cup 12, and terminates with its uppermost and open end 21' within the hood 15 above described.

The upper or projecting flange of the chamber-wall 19' is provided with a series of small apertures 22 (see also Fig. 5) which permit liquid to pass into the bottom of the cup 16 and beneath the bottom plate 19 of the air chamber, and it will therefore be seen that the body of liquid thus isolated to a considerable extent from the main body of the liquid in the reservoir 10, is spread out to cover the entire bottom of the cup 16, or as it may properly be called the "heating chamber," so that this comparatively small body of liquid can be heated to a boiling point very rapidly.

Practice has fully demonstrated that the preservation of heat in the small body of liquid is of the utmost importance in obtaining early results in "pump action," and particular pains have, therefore, been taken to prevent the heated liquid from reëntering or re-uniting with the main body of liquid in the reservoir, which by virtue of its low temperature would naturally tend to lower that of the liquid in the "heating chamber" and consequently retard the process of ebullition. In other words, in order to produce the best possible results, it becomes necessary to "check" the return of the liquid toward the reservoir so that the rapid expansion and generation of steam in the heating chamber may exert its full force in ejecting the liquid in the tube 21 upward, the liquid being naturally near boiling point.

By referring to Fig. 2 it will be seen that I have provided what may be termed a "check chamber" 25 formed by an inverted cup-shaped member 26 which rests upon the flange of the wall 19' and also comprises a well 27 the bottom of which is cut away as at 28 (see Fig. 3) to permit liquid to pass from the well over the top plate 20 of the air chamber $c$ and thence through the apertures 22 above mentioned, into the bottom of the cup 16. It will now be understood that, in order to return to the well, the liquid and its generated bubbles would have to move horizontally over the air chamber and toward the inlet passage 28, a condition which practice has shown does not materialize because the bubbles will rise into the closed chamber 25 and very little, if any liquid, can return into the well, particularly for the reason that the pulsations established by the rapid generation of steam in the heating chamber 16 are so rapid that the inertia of the liquid body above the air chamber $c$ together with the restricted passages are in themselves a sufficient resistance or "backing" for the steam forcibly to eject small bodies of the liquid column in the ejector tube as having the least resistance.

It is, of course, evident that some heat or steam bubbles will find their way into the liquid directly over the air chamber $c$, and therefore warm the same in a preparatory manner, this feature, however, being very desirable because the warmer the liquid to be heated, is, the more rapid will be the generation of steam and its consequent ejecting pulsations. In order still further to guard the comparatively small body of liquid in the cup 16 and over the chamber $c$, I provide a bonnet 30 formed in the shape of an inverted cup and having a tight joint with an air tube 31 which surrounds the ejector tube 21 and isolates the latter from contact with the liquid in the reservoir 10 and well 27. This bonnet is placed over the annular air chamber 17 and leaves only a small annular space between the inner face of the bonnet-wall and the outer face of the chamber-wall; and, by virtue of the construction and organization of the bonnet 30 with its supporting tube, the liquid will rise in the interior of the bonnet until the levels of the liquid in the reservoir 10 and ejector tube are the same, it being understood however that, on account of the closed-top feature of the bonnet an air space will be maintained between the top of the liquid in the inside of the bonnet, and the underside of the bonnet-top 30', the thin air space serving to prevent radiation of heat from the heated liquid in the cup 16 to the main body of liquid in the pot 10.

The bonnet is firmly secured to the air tube 31 the lower end of which is hermetically sealed to the ejector tube 21 and serves at this point as a shoulder for firmly drawing the ejector tube 21, member 26, and air chamber $c$ together by virtue of the screw thread above mentioned, while on the other hand these several elements may be readily taken apart and cleaned.

In Fig. 7 I have illustrated a modification of the bonnet which is, in the present instance composed of an inner shell 50, and an outer shell 51 inclosing between them an air space 52 which extends all around and over the top of the bonnet. This air space may stand in direct communication with the interior of the air tube 31, a vent-tube 53 (open at both of its ends but sealed to the shells 50, 51,) being provided to insure the inside of the bonnet being filled completely by the liquid, so that this construction will permit me to gage the film of liquid between the top of the annular air chamber 17 and the underside of the inner bonnet shell 52 accurately for any desired amount, while both bodies of liquid, viz. the main body in the reservoir 10 and the liquid in the cup 16 are separated by an air space, as 52, to prevent heat radiation between them.

Attention is called to the preferred manner of attaching the base plate 18 to the bottom of the cup 16, as clearly shown in Figs. 2 and 7, in which said base plate has a shoulder 18', and a central boss 18" which is passed through an aperture in the bottom of the cup 16, and the edge of which is subsequently headed or riveted over as shown at 18ª, so that in this manner I am enabled to obtain a very rigid joint at this place which will not leak and in which soldering is entirely dispensed with.

In practice the reservoir and the cap may be drawn up from sheet metal by a succession of progressive punches and dies, so that the liability of injury or loosening of the several parts as heretofore made, will be minimized.

Many changes may be made in the particular construction of the device without departing from the gist of the invention.

I claim:

1. The combination, with a reservoir having at its bottom a heating cup separated from the liquid in the reservoir by an air space completely surrounding the same, a closed air chamber disposed in said cup and for limiting the quantity of liquid to be heated in said cup, and having an aperture, and an ejector tube in communication with said aperture and sealed to said air chamber, of means in said cup for supporting said air chamber in said cup, and a bonnet having an air tight top and carried by said ejector tube, and for establishing an air space between the liquid in the cup and that in the reservoir.

2. The combination, with a reservoir having at its bottom a heating cup separated from the liquid in the reservoir by an air-space entirely surrounding the same, of a bonnet over said cup and establishing an air space between the liquid in the reservoir and that in the cup, an ejector tube projecting into said cup and having an air tight connection with said bonnet, a closed air chamber carried at the lower end of the ejector tube and for limiting the quantity of liquid to be heated in the cup, means in said cup for supporting said chamber in the cup, and means for permitting the passage of liquid from the upper portion of said cup to a point below said air chamber.

3. The combination, with a reservoir having at its bottom a heating cup separated from the liquid in the reservoir by an air-space entirely surrounding the same, of a bonnet over said cup and establishing an air space between the liquid in the reservoir and that in the cup, an ejector tube projecting into said cup and having an air tight connection with said bonnet, a closed air chamber carried at the lower end of the ejector tube and for limiting the quantity of liquid to be heated in the cup, said air chamber having a flange provided with apertures to permit the passage of liquid from the upper portion of said cup to a point below said air chamber, and a shoulder on the wall of said cup and for engaging said flange for supporting the chamber in the cup.

4. The combination, with a reservoir having at its bottom a heating cup separated from the liquid in the reservoir by an air space entirely surrounding the same, of a bonnet over said cup and for establishing an air space between the liquid in the reservoir and that in the cup, an ejector tube projecting into said cup and having an air tight connection with said bonnet, a closed air chamber carried at the lower end of the ejector tube and for limiting the quantity of liquid to be heated in the cup, a check member disposed over said air chamber and adapted to limit the quantity of liquid in contact with the top of said air chamber, means for permitting the passage of liquid from the upper portion of said cup to a point below said air chamber, and means for permitting the passage of liquid from the uppermost portion of said cup to the space between said check member and the top of the air chamber.

5. The combination, with a reservoir having at its bottom a heating cup, an ejector tube projecting into said cup, a sealed air chamber carried at the lower end of the ejector tube, and means for supporting said air chamber on the inner wall of said cup, of means for permitting the passage of liquid from the upper portion of said cup to a point below said air chamber, and a check member for establishing an air space between the liquid in the uppermost portion of said cup and the top of the air chamber.

6. The combination, with a reservoir having at its bottom a heating cup, an ejector tube projecting into said cup, a sealed air chamber carried at the lower end of the ejector tube and having an annular flange, a shoulder in the cup for supporting said flange, apertures in said flange to permit the passage of liquid therethrough, a check member resting with its rim on said flange and for establishing an air space between the liquid in the uppermost portion of said cup and the top of said air chamber, and having a cut-away portion near its center to allow liquid to pass into the space between the check member and the air chamber.

7. The combination, with a reservoir having at its bottom a heating cup, an ejector tube projecting into said cup, a sealed air chamber carried at the lower end of the ejector tube, and means carried by said cup and for supporting said air chamber therein, of a device for establishing an air space between the liquid in the reservoir and that in the cup and gaging the amount of liquid entering said cup, said device comprising an inner and an outer shell inclosing a sealed air space and having an air tight connection with said ejector tube.

JULIAN R. HOLLEY.

Witnesses:
   A. D. WILSON,
   C. F. SCHMELZ.